(No Model.)

P. S. N. PETERSEN.
CAR COUPLING.

No. 426,626.  Patented Apr. 29, 1890.

WITNESSES:

INVENTOR
P. S. N. Petersen
BY
Risley & Perry
ATTORNEY

UNITED STATES PATENT OFFICE.

PAUL S. N. PETERSEN, OF UTICA, NEW YORK.

CAR-COUPLING.

SPECIFICATION forming part of Letters Patent No. 426,626, dated April 29, 1890.

Application filed February 24, 1890. Serial No. 341,420. (No model.)

*To all whom it may concern:*

Be it known that I, PAUL S. N. PETERSEN, of the city of Utica, in the county of Oneida and State of New York, have invented certain new and useful Improvements in Car-Couplers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to improvements in car-couplers.

Figure 1:
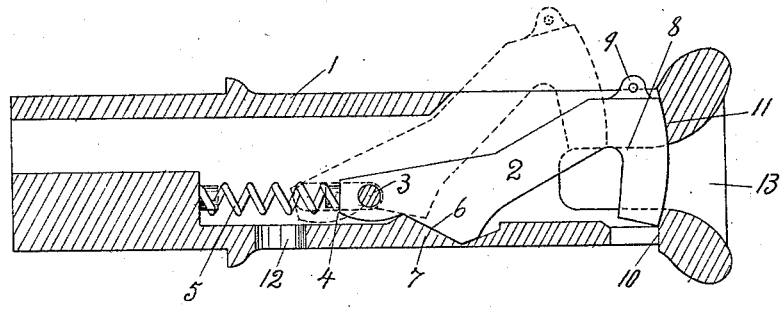
Figure 2:
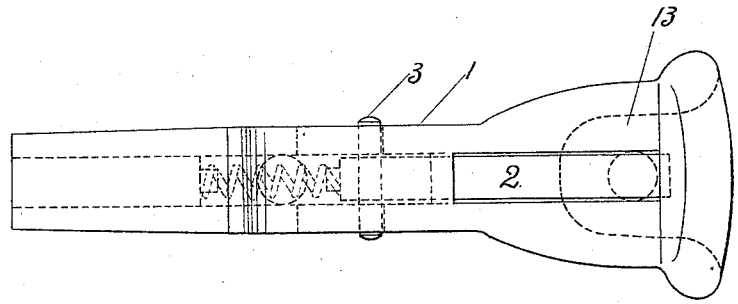

In the drawings which accompany and form a part of this specification, and in which similar numerals of reference refer to like parts in the several figures, Figure 1 shows a longitudinal section of a car-bumper involving the features of my invention. Fig. 2 shows a top view of the same.

Referring more specifically to the reference-numerals marked on the drawings, 1 indicates the bumper, which is provided with a conical opening 13 in its end, adapted to receive the coupling-link, which is of ordinary construction.

2 is a hook pivoted on pin 3, which pin is adapted to slide in a slot 4 in the draw-head. The free end of the hook is preferably in the form of a portion of a circle and abuts against walls 10 and 11 in the draw-head. Upon the draw-head is provided an inclined face 7, upon which slides inclined face 6 of hook 2.

5 is a spring located in the rear of the hook and adapted to move the hook toward the open end of the draw-head.

8 indicates the upper wall of the opening 13, above which the lower end of the hook is adapted to swing.

9 is a perforated lug on the hook 2, to which may be attached a chain or link with suitable other connections for uncoupling the coupler.

The operation of the device is substantially as follows: Normally the hook 2 is in the position shown in full lines in Fig. 1. In coupling cars the link is made to enter the open end 13 of the draw-head, and as it comes in contact with the rounded face of the hook 2 it forces the same backward, and in so doing the inclined face 6, acting upon the inclined face 7, and the pin 3, sliding along slot 4, cause the hook 2 to assume the position shown in dotted lines in Fig. 1, the hook being raised above the link. When the hook has been raised sufficiently by the action just described to free it from the link, the spring 5 forces the hook forward and it drops inside of the link, completing the coupling. When it is desired to uncouple the cars, the hook 2 is raised by means of a chain, link, or levers (not shown) attached to perforated lug 9, which frees the link and it may be withdrawn from the draw-head.

12 indicates an opening under the spring 5, through which access to spring 5 may be had, and in case of breakage a new one can be introduced into position through the opening 12.

What I claim as new, and desire to secure by Letters Patent, is—

1. The combination, in a car-coupler, of the draw-head having an inclined face thereon inclining toward the open end of the draw-head, and a hook having an inclined face adapted to engage on the inclined face of the draw-head, and the pivotal pin for the hook, substantially as set forth.

2. The combination, in a car-coupler, of the draw-head having an inclined face 7 thereon, a slotted opening 4, the hook 2, having inclined face 6, and pivotal pin 3, sliding in the opening 4, substantially as set forth.

3. The combination, in a car-coupler, of the draw-head 1, having inclined face 7, slotted opening 4, hook 2, having inclined face 6, pivotal pin 3, sliding in the opening 4, and a spring 5 between the hook and draw-head, substantially as set forth.

4. The combination, in a car-coupling device, with the draw-head having link-receiving opening 13, inclined face 7, and slotted opening 4, of the hook 2, having an inclined face 6, pivoted upon pin 3, movable within opening 4, and a spring 5 to throw the hook to its forward position, substantially as set forth.

5. The combination, in a car-coupling device, with the draw-head having link-receiving opening 13 and walls 10 and 11, inclined face 7, and slotted opening 4, of the coupling-hook 2, having inclined face 6, adapted to engage on face 7, pivotal pin 3, adapted to slide in opening 4, and the spring 5, adapted to throw the hook into its forward position, the hook having a rounded end adapted to engage walls 10 and 11, substantially as set forth.

6. The combination, in a car-coupling device, with the draw-head 1, having link-receiving opening 13, inclined face 7, and slotted opening 4, of the hook 2, having inclined face 6, adapted to engage upon face 7, pivotal pin 3 in the slotted opening 4, spring 5, and the perforated lug 9 on the hook 2, substantially as set forth.

In witness whereof I have affixed my signature in presence of two witnesses.

PAUL S. N. PETERSEN.

Witnesses:
M. E. ROBINSON,
L. S. CLARKE.